United States Patent [19]
Hazlebeck et al.

[11] Patent Number: 5,227,199
[45] Date of Patent: Jul. 13, 1993

[54] PROCESSES FOR APPLYING METAL OXIDE COATINGS FROM A LIQUID PHASE ONTO MULTIFILAMENT REFRACTORY FIBER TOWS

[75] Inventors: David A. Hazlebeck, El Cajon; Ileese Y. Glatter, Encinitas; Holger H. Streckert, San Diego, all of Calif.

[73] Assignee: General Atomics, San Diego, Calif.

[21] Appl. No.: 822,012

[22] Filed: Jan. 14, 1992

[51] Int. Cl.$^5$ .............................................. B05D 3/02
[52] U.S. Cl. ........................ 427/376.2; 427/419.2; 427/419.3; 427/434.6; 427/443.2; 428/263; 428/378; 428/384; 428/389
[58] Field of Search ............... 427/419.2, 419.3, 419.5, 427/434.6, 443.2, 397.7, 376.2; 428/263, 289, 290, 384, 389, 378; 65/60.52; 501/95

[56] References Cited

U.S. PATENT DOCUMENTS

| | | | |
|---|---|---|---|
| 4,129,434 | 12/1978 | Plumat et al. | 65/60 |
| 4,376,803 | 3/1983 | Katzman | 428/408 |
| 4,605,588 | 8/1986 | Simpson et al. | 428/288 |
| 4,623,591 | 11/1986 | Pike | 428/416 |
| 4,678,820 | 7/1987 | Pike | 428/378 |
| 4,732,879 | 3/1988 | Kalinowski et al. | 502/5 |
| 4,737,382 | 4/1988 | Katzman | 427/443.2 |
| 4,770,935 | 9/1988 | Yamamura et al. | 428/366 |
| 4,842,933 | 6/1989 | Cizmecioglu | 427/443.2 |
| 4,880,670 | 11/1989 | Erbil | 427/226 |
| 4,935,265 | 6/1990 | Pike | 427/226 |
| 4,970,097 | 11/1990 | Kalinowski | 428/379 |
| 4,983,422 | 1/1991 | Davis et al. | 427/419.3 |
| 5,024,859 | 6/1991 | Millard et al. | 428/389 |
| 5,034,356 | 7/1991 | Brun et al. | 501/95 |

FOREIGN PATENT DOCUMENTS

| | | | |
|---|---|---|---|
| 387468 | 9/1990 | European Pat. Off. | 427/434.6 |
| 63-236560 | 10/1988 | Japan | 427/419.2 |

Primary Examiner—Shrive Beck
Assistant Examiner—Terry J. Owens
Attorney, Agent, or Firm—Fitch, Even, Tabin & Flannery

[57] ABSTRACT

Refractory filaments in the form of a multifilament tow or fabrics woven therefrom are coated with protective oxide coatings to provide reinforcing materials that are useful in creating refractory composites. The refractory filaments are contacted with a liquid medium which contains a metal oxide or metal oxide precursor so that a substantially continuous coating of metal oxide or metal oxide precursor forms on the surface of each of the filaments. The filaments are then treated to substantially remove residual components of the liquid medium other than the metal oxide or metal oxide precursor. The coated filaments are stabilized, the above steps optionally are repeated to increase the coating thickness, and the coated filaments are heated to convert the metal oxide or metal oxide precursor into substantially continuous, uniform metal oxide coatings on the filaments.

20 Claims, 1 Drawing Sheet

PROCESSES FOR APPLYING METAL OXIDE COATINGS FROM A LIQUID PHASE ONTO MULTIFILAMENT REFRACTORY FIBER TOWS

This invention was made with Government support under Contract F49620-89-C-0078 awarded by the Department of the Air Force. The Government has certain rights in this invention.

This invention relates to processes for applying coatings to refractory filaments, and more particularly, the invention relates to processes for applying oxide coatings to multifilament fiber tows for use in the preparation of fiber-reinforced composites, which tows may be in the form of woven fabrics.

BACKGROUND OF THE INVENTION

Fibrous composites are promising lightweight, high-strength materials which retain their strength at high temperatures. The fibers contribute high tensile strength to the refractory matrix and also impart resistance to crack propagation. The high toughness of such composites has been characteristically associated with limited bonding between the fibers and the matrix in order to give substantial fiber pull-out as a major source of toughening. On the other hand, brittle failure in unsuccessful composites and resultant flat fractures with essentially no fiber pull-out have been attributed to strong fiber-matrix bonding.

Ceramic fiber-ceramic matrix composites offer unequaled high temperature performance and stability in oxidizing environments; however, fabrication of strong, tough composites is a difficult task. For purposes of this application, the adjectives ceramic and refractory are used generally interchangeably. A key factor in determining the properties of the composite is the nature of the interface between the matrix and the fiber. Fiber coating provides an effective and versatile method for controlling the fiber-matrix interface properties. Fiber coating also protects the fibers from degradation during the handling and composite fabrication process.

Good toughness characteristics can be introduced into composites with refractory fibers and a refractory matrix only when there is very limited bonding between the fibers and matrix, and between adjacent fibers. However, many possible combinations of fiber and matrix result in strong bonding over most, if not all, of the range of practical processing conditions, thereby limiting the potential toughness ranges of these composites. Such a problem exists, for example, with oxide-based fibers, because they have a tendency to degrade or react with the matrix when the refractory materials are molded. The reaction between the fiber and the matrix results in a high degree of bonding which renders the toughening mechanism inoperable. This problem for oxide-based fibers can be solved by creating a barrier coating on the fibers. Preferred barrier coatings are relatively inert and serve to physically separate the continuous phase refractory matrix and the reinforcing fibers. Such a barrier eliminates reactions between the oxide fibers and the refractory matrix or at least substantially slows the kinetics of such reactions so that toughening occurs in the composite. However, the adhesion of such an oxide coating to the associated fiber substrate for composite applications must be satisfactory to withstand the stresses to which the coated fibers are subjected in forming the composite structure.

While there are many methods for creating oxide and other refractory coatings on such fibers, none is considered completely suitable.

The traditional processes for fiber coating are chemical vapor deposition (CVD) and dip coating. CVD coatings typically must be performed at very low pressures and at moderate-to-high temperatures to achieve adequate infiltration of the tows. The by-products and/or reactants are often corrosive compounds such as hydrochloric acid. As a consequence, CVD fiber coating is complex and expensive. Dip coating in a preceramic polymer solution or a sol-gel solution is less expensive than CVD, but other problems are encountered. Primary obstacles to be overcome include nonuniformity throughout a multifilament tow, bridging between fibers, and tracking. Tracking is the preferential deposition of coating between fibers due to capillary effects during drying that does not result in bonding the two fibers together. Bridging is the bonding of adjacent fibers by the coating. Because of the complexity of CVD coating processes and because of the quality of the coatings obtained from traditional dip coating processes, new methods of fiber coating are being explored.

Accordingly, new coating processes for providing smooth, substantially uniform oxide coatings on continuous multifilament refractory fiber tows, and particularly on fabrics woven from such fiber tows, without requiring the use of expensive chemicals and/or processing steps are desirable.

SUMMARY OF THE INVENTION

In accordance with the present invention, inexpensive, readily accomplished processes have been developed for simultaneously applying thin, substantially uniform, continuous refractory coatings, e.g. metal oxide coatings, onto a plurality of continuous refractory filaments in the form of a fiber tow, with substantially no bridging of such coatings between adjacent filaments of the tow and no tracking. The tows may be coated, if desired, in the form of fabrics woven therefrom. Such coated fiber tows and fabrics can be advantageously employed for the preparation of fiber-reinforced composites having excellent strength and toughness properties.

Fiber tows can be processed in accordance with the present invention and result in the filaments being substantially uniformly coated, both continuously and uniformly along the length of each tow, with a refractory coating. The resulting coatings can impart stability to the individual filaments with respect to both high-temperature and/or oxidizing environments. The individual filaments of the tow become smoothly coated without any substantial degree of tracking or of bridging between individual filaments of the tow.

In respect to one particular aspect of the invention, coatings are grown on the individual filaments of each fiber tow in the liquid phase rather than being deposited as a result of drying or gelling. Using such growing processes, uniform films are created without the bridging or tracking normally associated with other liquid phase processes because the fiber tow remains totally wet during the establishment and attachment of the coating, and the coating material is not preferentially segregated to regions between adjacent filaments. Moreover, the uniformity of the coating is improved because the thickness of the coating is determined by a particular property of each filament, for example, the amount of reactant on each filament, rather than by the distribution of coating material within the interstices of the tow from which precipitation subsequently occurs. As a result, many of the advantages inherent in vapor phase processing can be obtained without the expense thereof.

DETAILED DESCRIPTION OF THE PREFERRED EMBODIMENTS

In one particular aspect, the present invention provides a process for applying a substantially uniform metal oxide coating having a thickness generally no greater than about 1.0 micron, onto a plurality of continuous, refractory filaments in the form of a fiber tow. In general, the process comprises the steps of:

(a) contacting said refractory fiber tow for a predetermined time with a liquid medium which contains a metal oxide or metal oxide precursor, said liquid medium being of a character such that a layer of said precursor at least about 50 angstroms becomes attached to the exterior surfaces of each of said filaments within said liquid medium;

(b) treating said filaments to stabilize said layers attached in step (a);

(c) optionally repeating steps (a) and (b) with the same or a similar liquid medium so as to increase the total thickness of said attached layers; and (d) heating said filaments under conditions which convert substantially all of said metal oxide or metal oxide precursor attached thereto into substantially continuous, uniform, metal oxide coatings.

Steps (a)-(d) can be optionally repeated so as to further increase the total thickness of the applied coatings. Alternatively, such repetition of steps (a)-(d) using a different liquid medium provides a convenient way to apply a coating of two or more layers of different metal oxides or of metal oxides of different densities onto the filaments.

In accordance with another aspect of the present invention, substantially uniformly coated continuous, multifilament refractory fiber tows, optionally in the form of woven fabrics, are prepared as described above, which can be combined with a continuous phase ceramic matrix to form a high temperature composite material. In accordance with yet another aspect, the present invention provides refractory fiber-reinforced composites comprising uniformly coated multifilament refractory fiber tows (prepared as described above) encapsulated within a refractory matrix.

As employed herein, the term "refractory" refers to an inorganic compound having a decomposition or softening point above about 1100° C. As employed herein, the term "refractory fibers" refers to inorganic fibers which, both before and after treatment in accordance with the present invention, have a decomposition temperature or softening point greater than about 1100° C.; with decomposition temperatures or softening points greater than about 1500° C. being preferred. Refractory fibers contemplated for use in the practice of the present invention typically have a continuous maximum operating temperature of greater than about 1000° C.; with maximum operating temperatures greater than about 1300° C. being preferred.

The preferred class of refractory fibers contemplated for use in the practice of the present invention are in the form of continuous filaments having diameters of about 50 microns or less. Multifilament refractory fiber tows, or fabric formed therefrom e.g. by weaving or its equivalent, are preferably used in the practice of the present invention and comprise a plurality of such filaments. As employed herein, the term "continuous" refers to filaments having a substantial length such that they might be woven into a fabric or like structure, if desired.

A wide variety of continuous multifilament refractory fiber tows can be employed in the practice of the present invention. Examples of such fiber compositions include silicon dioxide ($SiO_2$), aluminum silicates, such as mullite, aluminum oxide ($Al_2O_3$), titanium oxide ($TiO_2$), zirconium oxide ($ZrO_2$), zirconium silicate, silicon carbide (SiC), silicon nitride, boron nitride (BN) as well as other high temperature oxides, nitrides, carbides, silicates and the like known in the art of refractory fibers as useful in making composites. Generally, silicon carbide and silicon nitride refractory filaments are preferred. Tows made from SiC are commercially available from Nippon Carbon Co. of Tokyo, Japan, under the trademark Nicalon, and tows made from silicon nitride are sold under the trademark HPZ.

As indicated hereinbefore, the coatings are grown on the filaments in the liquid phase as opposed to being deposited, as by precipitation, during drying or gelling, and as a result, inherent advantages of gas-phase processing are obtained without the expense thereof. There are three preferred processes for growing films on filaments within a liquid environment. The first process utilizes the reaction of a metal alkoxide with a layer of metal hydroxide on the surface of the filament to create a uniform layer which can be subsequently converted to an oxide. The second utilizes the mechanism of thermophoretic deposition, and the third utilizes precipitation or growth from a supersaturated liquid solution. It has been found that when films are actually grown on the fibers located in a surrounding overall liquid environment, as a result of some physical and/or chemical property of the filament, rather than being formed upon the filaments as a result of evaporation or removal of a liquid solvent or carrier, there is significantly less bridging, tracking and other nonuniformities than that which occurs with such processes.

Metal oxides which can be employed as some of the ultimate refractory coatings for the refractory filaments are generally identified by the formula $M_xO_y$, wherein M is selected from Group II metals, Group III metals, Group IV metals, transition metals, and lanthanide metals; and x and y are selected so as to satisfy the valence of M and O. Exemplary metal oxides include $Al_2O_3$, $Y_2O_3$, $HfO_2$, $ZrO_2$, $Nb_2O_5$, $SiO_2$, $MgO$, $TiO_2$, $Ta_2O_5$, $BaO$, $BeO$, $CaO$, $Ce_2O_5$, $Cr_2O_3$, $La_2O_3$, $SrO$, $TiO$, and $TiO_2$; the first five oxides and nickel-lanthanum oxide are preferred. YAG ($3Y_2O_3 \cdot 5Al_2O_3$), mullite, mixtures and complexes of two or more of the foregoing may be used in certain processes. Moreover suitable precursors may alternatively be employed to grow layers which can be cured as known in this art and then calcined and sintered to provide BN protective coatings. For example, BN coatings can be provided using $(CH_3)_2S \cdot BHBr_2$ in the form of a solution in $CH_2Cl_2$ or toluene, which could be employed in the third process mentioned above by creating a supersaturated solution.

Metal oxide is supplied to the process in a suitable liquid form containing either the metal oxide or a suitable metal oxide precursor and preferably in the form of a bath in which the filaments are immersed as, for example, by passing a multifilament fiber tow, or a fabric made therefrom, through such a bath. The liquid medium may be present in the form of a metal salt solution which may include salts such as carbonates, halides, sulfates, and nitrates. It may alternatively be a sol, particularly one made from oxides, hydroxides and partially hydrolyzed alkoxides. It may also be an organometallic solution, e.g. one which includes alkoxides or acetates. The concentration of the metal in the liquid medium will vary depending upon which of the three processes is being used. Typically, the metal concentrations will fall within a range of about 0.05 mole to about 3 moles per liter. It may be possible to use either aqueous or nonaqueous solutions depending upon the particular process being practiced, and the solvent for nonaqueous solutions may include alcohols of up to 10 carbon atoms, saturated and unsaturated hydrocarbons, and aromatic hydrocarbons having up to about 10 carbon atoms, as well as aldehydes, ketones, ethers and amines of up to about 10 carbon atoms in length.

The first process is generally referred to as growth from a metal alkoxide solution and is a preferred method for coating refractory fiber tows. When growth from an alkoxide solution is utilized, a very thin layer, for example, one about 20 angstroms to about 50 angstroms thick, of a metal hydroxide which carries with it some adsorbed water is first deposited on the filaments using a suitable liquid-phase coating method. Fabrication of such initial layers of such thickness can be relatively easily achieved without encountering bridging or tracking problems. Methods for producing such initial, thin, metal hydroxide coatings are described in detail in an article which appeared in *Ceramic Engineering & Science Proceedings*, Vol. 13 [7-8] pp. 1075-1085 (July-August 1991). For example, the article describes the traditional dip coating in a preceramic polymer solution or a sol-gel solution as one example of a method that might be employed. As previously indicated, the purpose of this first step is to provide a layer of metal hydroxide and adsorbed water on the outer surface of the filaments upon which the desired coatings can thereafter be grown from a metal alkoxide solution. Another method of preliminary application of such a metal hydroxide layer is described in the article as one wherein dip coating is followed by in situ curing. Although these processes are generally described in terms of coating fiber tows, it may ultimately be preferred to coat continuous lengths of fabric woven from such tows.

Very generally, the tow is immersed by dipping into a nonaqueous solution of a metal alkoxide (or another suitable organometallic substance) that will react with the metal hydroxide and the adsorbed water covering the exterior surfaces of the filaments. Immersion of such a fiber tow is conveniently carried out by dipping the tow in a bath of a liquid metal alkoxide solution, for example, by threading it under a pair of suitable rollers so that it travels along a horizontal run within the bath. While within the bath, metal alkoxide from the solution, which generally utilizes an alcohol solvent, bonds to the layer on the filaments by reacting with the hydroxide groups to produce a free alcohol and create a metal oxide bond. This reaction proceeds so long as hydroxide groups are available, and when all of the hydroxide in the initial layer has been expended, it may cease. As a result of this reaction, an extremely uniform layer or film is attached to each filament.

The basic chemical reaction which takes place in the coating bath, which is preferably an alcohol solution, is generally represented by the following formula:

wherein a, b, c and d may be integers.

Thereafter, the filament substrate, i.e. the multifilament fiber tow that has been so coated, is rinsed with pure solvent, for example, by immersing it in an adjacent bath of solvent alone. The rinsing step removes any unbound alkoxide from the exterior regions of the coated filaments, leaving only the thin layer of bound alkoxide.

The bound alkoxide is then stabilized by conversion to hydroxide by treatment with water vapor or with an aqueous solution at a suitable temperature. Preferably, treatment is with water vapor or steam at a temperature of between about 70° C. and about 100° C. The basic chemical reaction that occurs in this curing step is generally represented by the following formula:

wherein i, j, and k may be integers.

Usually the fiber tows or fabrics will be caused to be subjected to multiple passes through the coating bath in order to build up a layer of desired thickness; commonly a minimum of about 4 to 8 passes are used. After each curing step, the layer which is attached has been transformed to the metal oxide-hydroxide form with adsorbed water, and to be certain that only adsorbed water is carried into the alcohol solution of the metal alkoxide, a drying step is employed. Suitable drying is effected by subjecting the coated tow to heat so as to drive off all interstitial water, which is sometimes referred to as bulk water, as for example by exposing the cured fiber tow to a convection dryer or to a circulating air stream at a temperature of between about 120° C. and about 300° C. for about 1.5 to about 10 minutes.

When the dried tow reenters the coating bath, metal alkoxide from the solution again reacts with and bonds to the surface of the filaments via reaction with surface hydroxide groups and adsorbed water in the same manner as described hereinbefore. Accordingly, the entire cycle is repeated to apply gradually thicker layers of metal oxide-hydroxide on the exterior surface of each of the filaments. Thus, it is contemplated that the tow will make multiple passes through the reaction coating bath, through the solvent wash bath, through the curing station and through the drying station, and suitable roller-guided pathways are provided.

Once a coating of desired thickness has been achieved, after leaving the curing station for the last time, the multiply reaction-coated fiber tow is caused to be transported to a calcination-sintering station where the oxide-hydroxide coating is fired and converted to substantially pure metal oxide, e.g. by heating to between about 800° C. and about 1200° C. for at least about 5 minutes but not usually exceeding about 30 minutes to 1 hour. The basic chemical reaction that occurs at this station is generally represented by the following formula:

$$M_pO_q(OH)_r \cdot Fiber \rightarrow M_pO_{(q+r/2)} \cdot Fibre + rH_2O(g)$$

wherein p, q and r may be integers. Examination of the coated filaments shows that an extremely high quality coating is achieved without any substantial bridging or tracking. The individual exterior surfaces of the coating are extremely smooth, and the thickness of the coating about the periphery of the refractory filament is extremely uniform.

Generally, to achieve ultimate coatings about 1000 to about 2000 angstroms thick, about 10 to 15 passes through the metal alkoxide solution may be desired with each pass applying a layer at least about 50 Å thick. On the average, an additional layer of cured metal oxide-hydroxide of about 55-125 Å is usually attached during each pass, with the ultimate oxide coating being provided with an additional thickness of about 50 to 100 Å as a result of each pass. As many as 15-30 passes may be made prior to treating the coated fiber tow in the calcining-sintering step. If one wished to create a 2-layer coating, e.g., a $ZrO_2$ layer within a $Y_2O_3$ layer, it may be desirable to calcine the coated filaments after about 8 passes through the appropriate zirconia coating bath and then repeat the coating process using an appropriate yttria coating bath in order to essentially double the thickness of the metal oxide coating, in a second stage of the process.

In general, it should be understood that it is desirable to maintain the metal alkoxide coating bath under a nitrogen or other inert atmosphere because alkoxides are very reactive with water vapor in the air, and it is convenient to also maintain the solvent bath under a similar atmosphere. Accordingly, these two baths can be provided within a closed chamber wherein such a nitrogen atmosphere is maintained, with the entry to and exit from the chamber being through suitable limited openings in a septum that provide entrances or exits for the fiber tow, with minimum clearance so as to avoid excessive leakage of the inerting gas. However, contact between the edges of the septum and the rinsed fiber tow is not considered a problem because the metal alkoxide has chemically bonded to the surface layers on the filaments. In fact, the rinsed fiber tow can be passed over a roller and cured and/or dried in a horizontal orientation, if desired. It is also necessary to periodically replenish the solvent bath to prevent the buildup of the metal alkoxide to a significant extent therein which would prevent complete rinsing of the fiber tow, and such might be carried out, if desired, by maintaining a slow gradual supply of fresh solvent to the rinsing bath with the withdrawn solvent being purified for reuse by removal of the metal alkoxide.

A second process for producing desired refractory coatings on refractory filaments preferably utilizes a sol of metal oxide, metal hydroxide or a partially hydrolyzed metal alkoxide, wherein the coating is grown from the sol by the mechanism of thermophoresis. For example, the tow is either heated or cooled to a temperature such that a sol, which is stable at, for example, ambient conditions, becomes unstable at the temperature of the refractory filaments in the fiber tow. Thereafter, when the tow is immersed in the sol (and immersion can be effected in the manner described hereinbefore with respect to the alkoxide solution bath), oxide, alkoxide or hydroxide particles from the sol are deposited on the tow as a result of this temperature difference in the immediate region of the exterior surface of the filament that creates the instability. As a result, a film of metal oxide, metal hydroxide or metal alkoxide particles grows directly on the surfaces of the filaments, and a bonding or physical attachment to the exterior surface of the filaments is accomplished within the overall liquid environment. When metal oxide, metal hydroxide or metal alkoxide sols are employed, any suitable refractory filaments can be used.

When the tow exits from the sol, it is again subjected to a rinse in pure solvent, as generally hereinbefore described with regard to the metal alkoxide reaction coating process. In the rinse, the liquid medium and any particles not attached to the exterior surfaces of the filaments are removed, whereas those particles physically attached are retained. The tow then exits from the rinse bath as before and is transferred to a station wherein the residual pure solvent is removed to dry the tow without interfering with the adhering particles and thereby stabilize the coated layer. Depending upon the sol used, a curing step may not be needed; however, if a partially hydrolyzed metal alkoxide sol is used, it could be optionally cured with water vapor or steam to fully hydrolyze it and thereby further stabilize it. Although it may then be subjected to a calcining-sintering step, it is preferable to subject the coated fiber tow or fabric to one or more additional passes through the thermophoretic coating sol, in which case, the tow or fabric is preferably first dried, in order to promote reinfiltration of the sol, and again subjected to an appropriate heating and/or cooling step so as to raise or lower the temperature of the filaments and the adhering metal oxide, metal hydroxide or metal alkoxide particles to the desired instability temperature discussed hereinbefore. Such additional passes through the coating sol bath, followed by a pure solvent rinse, accordingly increase the thickness of the uniform layer of adhering particles. Again, examination of the refractory tow following the calcining and sintering shows that, as a result of growing the layer of metal oxide, hydroxide or alkoxide particles on the surfaces of the filaments within the liquid sol, extremely uniform individual coatings are achieved which are smooth and free from substantially all bridging and/or tracking.

The third process for obtaining these refractory material coatings utilizes a coating bath in the form of a hot saturated solution of a metal salt or an organometallic. A metal salt is used wherein the metal ion or metal complex that is chosen has a significantly higher solubility in the solvent at elevated temperatures as opposed to lower temperatures. Examples include solutions of salts and organometallics, such as yttrium nitrate and yttrium acetate. The coating bath is then heated in its bottom region wherein some undissolved excess metal salt is preferably present and suitably cooled in its upper region, as by using a cooling coil or possibly surface evaporation, so as to create a thermal gradient and a natural convection throughout the bath. As a result, the upper region of the coating bath solution where the cooling is taking place becomes supersaturated. The fiber tow or fabric which is to be coated is then immersed in the upper region of this supersaturated portion of the coating bath, and the physical presence of the refractory filaments causes the metal salt to be deposited onto and attach to the surfaces thereof because of the supersaturated conditions. The tow or fabric coated in this manner is then caused to be subjected to a rinsing bath of another solvent in which the salt is insoluble, but which displaces the remaining solution so that, upon eventual evaporation, the solute contained therein is not deposited onto the previously grown film which has occurred as a result of the disruption of the supersaturation conditions in the overall liquid environment. Drying of the rinsed fiber tow or fabric is then preferably effected to remove the added solvent and stabilize the coated layer. The coated refractory fiber tow or fabric is then preferably caused to travel to a calcining-sintering station. Again, the growing of the predecessor refractory material coatings on the filaments in an overall liquid environment results in smooth, uniform coatings without any substantial bridging or tracking.

Generally it is desired to produce fiber tows wherein the individual filaments are coated with a metal oxide or other desired refractory material having a thickness of at least about 0.1 micron; one micron equals 10,000 angstroms. Normally the thickness of oxide coatings will not exceed about 0.5 micron on the individual filaments.

Sols are essentially solutions containing a polymeric network of partially hydrolyzed or fully hydrolyzed metal salts, metal alkoxides or other organometallics. Such sols can be prepared by procedures known to those of skill in the art.

Suitable metal alkoxides for use in the metal alkoxide reaction growing process preferably include those having alkyl groups of up to about 10 carbon atoms. Suitable metal alkoxides include compounds of a wide variety of metals, such as those of Groups II, III, and IV of the Periodic Table, as well as transition metals and other multivalent (e.g., +3, +4, +5, and the like) metals whose alkoxides form polymeric networks upon hydrolysis. Exemplary metals which meet the above description include boron, aluminum, titanium, hafnium, yttrium, magnesium, niobium, silicon, zirconium, and other refractory types of metals. Exemplary suitable metal alkoxides include tetramethoxysilane, tetraethoxysilane, methyltrimethoxysilane, ethyltriethoxysilane, amyltriethoxysilane, tetraethoxytitanium, aluminum butoxide, such as aluminum sec-butoxide, yttrium triisopropoxide, hafnium isopropoxide, zirconium isopropoxide, hafnium n-butoxide, zirconium n-butoxide, and the like.

Suitable alcohols for use in metal alkoxide solutions include alcohols having up to about 10 carbon atoms. Often, the alkyl portion of the alcohol will be the same as that of the alkyl portion of the alkoxide. Ethanol and propanol are the preferred alcohols. In general, as with the alkoxides, the higher the molecular weight of the alcohol employed, the slower will be the subsequent drying process, as will the polymerization process for the network. It is also possible to use in place of, or in addition to the metal alkoxides, combination derivatives of alkoxides and alcohols, such as, for example, methoxyethanols.

The art of composite materials is well developed, and a wide variety of matrix materials useful therein are commercially available. Generally, any suitable ceramic matrix materials of such type may potentially be used in the broad practice of the present invention. Matrix compositions including silicon carbide, silicon nitride, boron nitride, zirconium oxide, silicon oxide, aluminum oxide, zirconium-titanium oxide blends, mullite, cordierite, beta-spodumene, anorthite, osumilite, titanium aluminide, titanium-tantalum aluminide, molybdenum disilicide, and the like can be employed.

For the making of the composites according to one aspect of the present invention, a continuous phase matrix material is used along with oxide-coated fiber tows or fabrics formed as described hereinbefore, which are dispersed therein. The fiber tows can be incorporated into a composite arranged in any manner that adequately reinforces the matrix material. The multifilament tows can be woven into fabrics or sheets, formed into a cloth, arranged in a multidirectional array, chopped into staple fiber lengths and laid up in any desired shape, and so forth.

A proportion of at least about 30% of the multifilament tows, by volume, is recommended to be included in the refractory fiber composites of the present invention, with in the range of about 40 up to 60 volume percent multifilament tow content presently being preferred.

Contacting of continuous, multifilament refractory fiber tows with the liquid medium of a coating bath is typically carried out for a time sufficient to allow the liquid medium to thoroughly wet substantially all the filaments of the fiber tow. Such contacting is typically carried out with the bath at a temperature in the range of between about 15° C. to about 100° C., for a time in the range of about 0.05 minute to about 5 minutes. As employed herein, the terms "thoroughly wet" or "thoroughly wetted" indicate that the liquid and the filaments come into sufficiently intimate contact with each other so that the liquid forms a substantially continuous film on the surface of each of the filaments.

Figure 1:
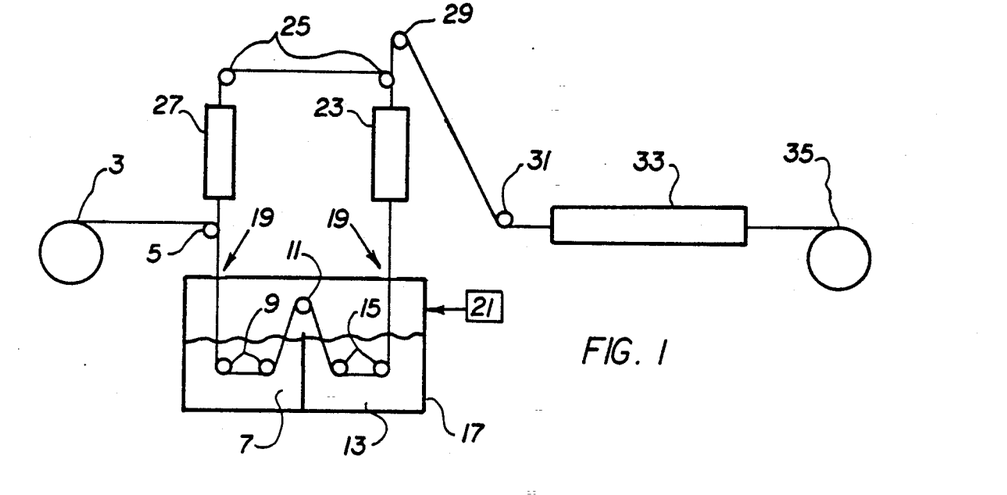
FIG. 1 is a schematic diagram of apparatus which can be used in the practice of the present invention.
Figure 2:
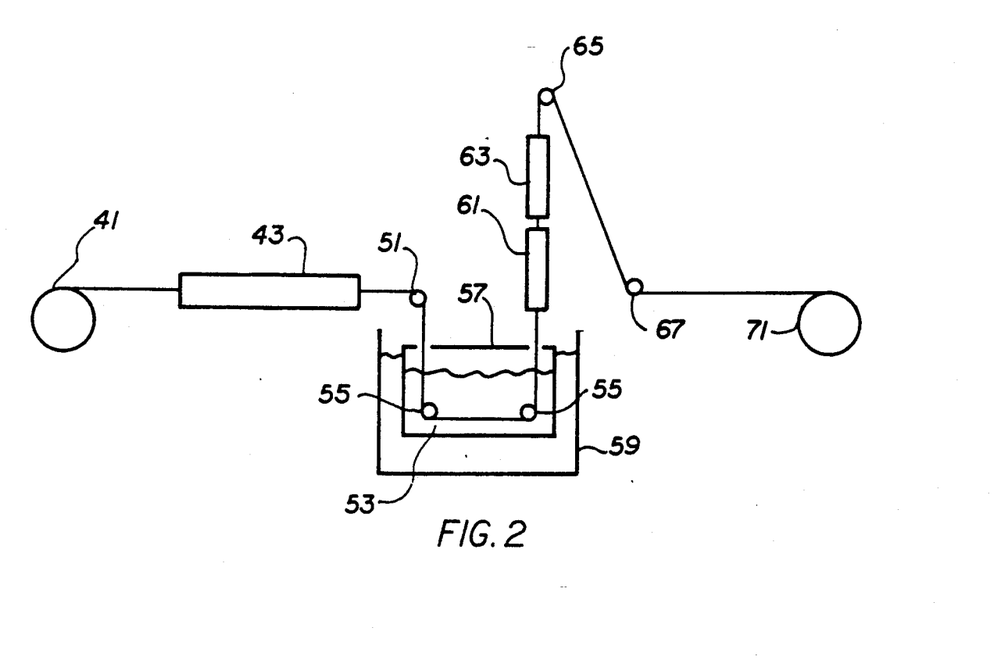
FIG. 2 is a schematic diagram of apparatus which can be used to prepare a supply spool of pre-coated refractory fiber tow for employment in a process carried out using the apparatus of FIG. 1.

Shown in the drawings are two schematic representations which illustrate exemplary apparatus that might be employed in carrying out processes embodying particular features of the invention. FIG. 1 illustrates the coating apparatus wherein a multifilament refractory fiber tow, in which a metal hydroxide layer has been initially applied to each of its filaments, is coated using the reaction process wherein the coating is grown from a metal alkoxide solution. A supply spool or roll 3 of such precoated refractory fiber tow is fed over a direction-changing roller 5 and then downward into a liquid coating bath 7 which may contain, for example, a nonaqueous solution of metal alkoxide. The tow passes under a pair of rollers 9 in the bath and then exits through the upper surface, passing over a roller 11 located above the bath, where it reverses its direction so as to travel downward into a rinse bath 13 into which the tow is next immersed. It passes under a pair of rollers 15 in the rinse bath and exits vertically upward. As illustrated, the coating bath and the rinse bath are preferably provided within a generally closed, compartmented enclosure or chamber 17 in which entrances and exits are provided for the tow via a plurality of apertures 19. The chamber is preferably inerted by supply of nitrogen or some other suitable inert gas from a source 21 to exclude humidity-bearing ambient air.

The solvent-rinsed tow passes upward through a curing station 23 and then over a pair of rollers 25 to change its direction so that it travels downward through a drying station 27 and reenters the chamber 17 for another pass through a suitable entrance 19. After the tow has made the desired number of passes through the combination of the compartmented chamber 17, the curing station 23 and the drying station 27, it is directed to a pair of rollers 29 and 31 on its way to a calcination-sintering station 33, after which it is wound onto a suitable takeup spool 35. Generally similar apparatus can be constructed and employed for coating continuous lengths of fabric which has been woven from such fiber tows.

Illustrated in FIG. 2 is a representative apparatus that might be employed to pre-coat the multi-filament refractory fiber tow with a thin layer of metal hydroxide. In the schematically illustrated process, a refractory fiber tow is provided from a supply spool 41 and passed through a desizing chamber 43 where the refractory fiber is heated to a temperature of between about 550° C. and about 700° C. for about 5 minutes in an oxidizing atmosphere so as to remove any organic contaminants from the surfaces of the individual filaments within the multifilament tow. When the tow exits from the desizing chamber, it passes over a roller 51 and then downward into a liquid reservoir 53 which is maintained in a generally closed chamber 57. The tow enters and exits vertically, and it passes under a pair of rollers 55 to create a horizontal run within the liquid reservoir. The liquid within the reservoir 53 is maintained at a substantially constant temperature by the use of a surrounding water bath 59 which is maintained at the desired temperature; however, this is considered optional. After completion of what is commonly referred to as dip-coating in the reservoir, the coated refractory fiber tow passes upward through a curing station 61 wherein in situ conversion to create a metal hydroxide coating is effected and then through a drying chamber 63 to remove bulk water. Thereafter, the dried refractory fiber tow passes over rollers 65 and 67 and then is accumulated onto a takeup spool 71.

The following examples illustrate several preferred processes for carrying out the coating of multifilament refractory fiber tows embodying particular features of the invention. Although the examples include certain preferred process conditions, they should not be understood to constitute limitations upon the scope of the invention which is defined by the claims appended hereto.

EXAMPLE 1

A multifilament fiber tow of silicon carbide fibers sold under the trademark "Nicalon" is first immersed in a solution of zirconium n-butoxide in isopropanol and then subjected to in situ curing with 70° C. water vapor, i.e. air at 70° C. saturated with $H_2O$. It is thereafter dried to produce a zirconium hydroxide coating about 50 angstroms thick on each of the filaments in the fiber tow, which is then wound on a takeup spool for subsequent use.

An alkoxide coating solution is prepared from zirconium isopropoxide, which is a liquid at ambient temperature in isopropanol at a ratio of 10 milliliters of zirconium isopropoxide to 90 milliliters of isopropanol. Using apparatus similar to that illustrated in FIG. 1, the zirconium hydroxide-coated fiber tow is fed into the alkoxide coating solution so that it is in contact with the solution at ambient temperature, i.e. about 22° C. for about 5 minutes. Next, the tow is caused to travel into a rinse bath of isopropanol, wherein it is also retained for about 5 minutes to remove residual zirconium isopropoxide solution. The coating solution and the rinse bath are maintained under a nitrogen atmosphere.

Following rinsing, the fiber tow is subjected to steam at 100° C. for 5 minutes, which converts the bound zirconium isopropoxide to zirconium hydroxide. The tow is next subjected to drying in a circulating air atmosphere for about 5 minutes at 200° C. to remove any interstertial or bulk water.

The foregoing coating-treating steps are repeated three more times, and thereafter the coated tow is calcined and sintered at about 800° C. for about 24 minutes.

The thickness and quality of the coatings on the individual filaments are examined using scanning electron microscopy (SEM), and energy dispersive X-ray spectroscopy (EDXS). Mechanical testing is also performed to evaluate interaction with the filaments within the fiber tow. The testing shows that a zirconium oxide coating having an average thickness of about 500 angstroms surrounds each of the individual filaments. The smoothness, adherence and the uniformity of the oxide coatings is considered to be significantly improved over coatings of this approximate thickness that had previously been obtained using only the in situ curing method or the earlier dip-coating method. In addition to having achieved uniform coating growth, substantially no bridging or tracking is evident, and the mechanical testing shows the zirconium oxide-coated fiber tows have good mechanical performance characteristics.

EXAMPLE 2

A multifilament fiber tow of silicon carbide fibers sold under the trademark "Nicalon" is first immersed in a solution of yttrium nitrate in water and then subjected to in situ curing with $H_2O$-saturated $NH_3$. It is thereafter dried to produce a yttrium hydroxide coating about 50 angstroms thick on each of the filaments in the fiber tow, which is then wound on a takeup spool for subsequent use.

An alkoxide coating solution is prepared from yttrium isopropoxide, which is a solid at ambient temperature, in isopropanol at an amount of 0.12 mole of yttrium isopropoxide per liter of isopropanol. Using apparatus similar to that illustrated in FIG. 1, the yttrium hydroxide-coated fiber tow is fed into the alkoxide coating solution so that it is in contact with the solution at ambient temperature, i.e. about 22° C. for about 5 minutes. Next, the tow is caused to travel into a rinse bath of isopropanol, wherein it is also retained for about 5 minutes to remove residual yttrium isopropoxide solution. The coating solution and the rinse bath are maintained under a nitrogen atmosphere.

Following rinsing, the fiber tow is subjected to steam at 100° C. for 5 minutes, which converts the bound yttrium isopropoxide to yttrium hydroxide. The tow is next subjected to drying in a circulating air atmosphere for about 5 minutes at about 150° C. to remove any interstertial or bulk water.

The foregoing coating-treating steps are repeated four more times, and thereafter the coated tow is calcined and sintered at about 800° C. for about 24 minutes.

The thickness and quality of the coatings on the individual filaments are examined using scanning electron microscopy (SEM) and energy dispersive X-ray spectroscopy (EDXS). Mechanical testing is also performed to evaluate interaction with the filaments within the fiber tow. The testing showed that a yttrium oxide coating having an average thickness of about 400 angstroms surrounds each of the individual filaments. The smoothness, adherence and the uniformity of the oxide coating is considered to be significantly improved over coatings of this approximate thickness that had previously been obtained using only the in situ curing method or the earlier dip-coating method. In addition to having achieved uniform coating growth, substantially no bridging or tracking is evident, and the mechanical testing shows the yttrium oxide-coated fiber tows have good mechanical performance characteristics.

EXAMPLE 3

A reservoir of an aqueous alumina sol is maintained at a temperature of about 22° C. A multifilament NICALON silicon carbide fiber tow is heated to about 70° C. and is caused to pass through the coating bath so that it is exposed to the liquid medium for about 5 minutes. The raising of the temperature of the sol at its interface with the individual filaments causes alumina to precipitate onto the exterior surfaces of the warmer filaments. After exiting the coating reservoir, the fiber tow is treated with water to remove any interstertial residual alumina sol without removing the precipitated particles of alumina, and it is then passed through a drying station where it is exposed a temperature of about 200° C. to dry the tow. The tow is then returned to a temperature of about 70° C. for another pass through the coating reservoir.

After a total of about 5 passes, the alumina-coated fiber tow is transferred to a calcining-sintering station where it is subjected to about 800° C. for about 24 minutes to sinter the alumina. Examination of the coated fiber tow shows that the individual filaments have uniform thickness coatings of alumina about 3000 angstroms in average thickness, good smoothness, and substantially no bridging for tracking is evident.

EXAMPLE 4

A multifilament NICALON silicon carbide fiber tow woven into a fabric is pulled slowly through a supersaturated solution of yttrium nitrate in isopropanol. This coating reservoir is maintained in desired form by applying heat to the lower portion of the reservoir of the yttrium nitrate solution as by surrounding it with a constant temperature water bath at a temperature of about 60° C. Sufficient yttrium nitrate is provided so that some undissolved yttrium nitrate is present at the bottom of the chamber holding the reservoir at all times. A cooling coil is provided in an upper region of the reservoir and is operated so as to lower the temperature of the upper region to about 30° C. This temperature differential not only assures a natural circulation within the reservoir, from the heated bottom region upward to the upper cooler region and then downward therefrom, but it assures that a supersaturated yttrium nitrate solution exists within the cooled upper region.

It is through this supersaturated region that the fabric is caused to very slowly travel, and the physical presence of such substrate within the supersaturated region causes yttrium nitrate particles to precipitate onto that substrate. As a result, uniform layers of minute particles of yttrium nitrate grow on the exterior surfaces of the individual filaments as the woven fabric slowly travels through the upper region of the reservoir. The conditions are such that the woven tows are in contact with the supersaturated liquid medium within the reservoir for up to about 60 minutes. Following its exit from the coating reservoir, the fabric is treated to remove any residual solution by exposure to another organic solvent, such as benzene, at about 30° C. in which yttrium nitrate is not significantly soluble. The fabric is then dried at about 200° C. and transferred to a calcining-sintering station wherein it is heated to a temperature of about 800° C. for about 24 minutes in air to convert the yttrium nitrate to yttrium oxide. Optionally, it can be first converted, if desired, to yttrium hydroxide using ammonia and water. Examination of the coated fabric shows that the individual filaments of the woven tows have uniform thickness coatings of yttrium oxide, about 3000 angstroms in average thickness, good smoothness, and substantially no bridging for tracking is evident.

EXAMPLE 5

The process of Example 2 is repeated, substituting a 6-inch wide woven fabric of silicon carbide fiber tow for the NICALON tow used therein. The same steps and conditions are used. Examination of individual filaments selected from various sections of the coated tows from the fabrics shows that the quality and uniformity of the coatings are substantially as good as those obtained in Example 2.

Although the invention has been hereinbefore described with regard to certain preferred embodiments which include the best mode presently known to the Applicants for carrying out their improved processes for creating protective coatings by growth in a liquid medium, it should be understood that various changes and modifications as would be obvious to one having the ordinary skill in this art may be made without deviating from the scope of the invention which is defined by the claims appended hereto. For example, should it be desired to provide a mixed oxide coating on a refractory fiber tow, such can be achieved by using the processes described in Examples 1 and 2 and alternating passes through the two coating reservoirs. For example, the fiber tow could first be coated with zirconium hydroxide, then passed through the yttrium alkoxide coating bath and cured, and then subjected to alternating passes through the zirconium alkoxide coating bath and the yttrium alkoxide coating bath (and the curing and drying stations) until the desired thickness of coating is obtained. Thereafter, the calcining-sintering step is used to cause the alternating layers to interdiffuse, and if desired, calcining-sintering could be carried out at a slightly lower temperature for a longer period of time to promote interdiffusion of the thin alternating layers and thus effectively provide mixed zirconium-yttrium oxide coatings on the individual filaments.

Particular features of the invention are set forth in the claims that follow.

What is claimed is:

1. A process for applying substantially uniform metal oxide coatings onto a plurality of refractory filaments in a multifilament tow, which process comprises
   (a) applying a layer of metal hydroxide and adsorbed water to the exterior surfaces of each of said plurality of refractory filaments in said tow,
   (b) contacting said tow of refractory filaments carrying said metal hydroxide layers on the surface of each of said filaments with a liquid medium which contains a solution of a metal alkoxide so that a substantially continuous film forms on the surface of each of said filaments, the chemical composition of said liquid medium causing a layer of said metal alkoxide of at least about 50 angstroms to become attached to said metal hydroxide-carrying surfaces of said filaments within said liquid medium;
   (c) treating said filaments and said layers attached thereto in step (b) to substantially remove residual components of said liquid medium therefrom other than said attached metal alkoxide;
   (d) treating said filaments and said attached layers with water vapor to convert said attached layers from alkoxide to hydroxide;

(e) repeating steps (b) to (d) with either the same liquid medium or a liquid medium of a metal alkoxide solution of a different metal so as to increase the total thickness of said attached layer on each filament; and (f) heating said filaments under conditions which convert substantially all of said metal hydroxide attached thereto into substantially continuous, uniform, metal oxide coatings.

2. A process according to claim 1 wherein following step (d) said tow is dried to remove bulk water but not adsorbed water.

3. A process according to claim 2 wherein said fiber tow is in the form of a woven fabric.

4. A process according to claim 3 wherein said contacting is carried out by moving said fiber tow through said liquid medium.

5. A process according to claim 1 wherein said repeating of steps (b) to (d) is performed a sufficient number of times so that said final metal oxide coating has a thickness of between about 400 and about 2000 angstroms.

6. A process for applying substantially uniform metal oxide coatings onto a plurality of refractory filaments in the form of a fiber tow, which process comprises (a) contacting said refractory fiber tow with a liquid medium which contains a metal oxide or metal oxide precursor so that a substantially continuous film forms on the surface of each of said filaments, said liquid medium having a chemical composition such that a layer of said metal oxide or precursor at least about 50 angstroms thick becomes attached to the exterior surfaces of each of said filaments within said liquid medium;

(b) treating said fiber tow to substantially remove residual components of said liquid medium therefrom other than said metal oxide or metal oxide precursor and then treating said filaments and said attached layers to stabilize said layers attached in step (a);

(c) optionally repeating steps (a) and (b) with the same liquid medium or with a liquid medium which is the same except for containing a metal oxide or metal oxide precursor of a different metal so as to increase the total thickness of said attached layers; and (d) heating said filaments and said stabilized attached layers under conditions which convert substantially all of said metal oxide or metal oxide precursor attached thereto into substantially continuous, uniform, metal oxide coatings.

7. A process according to claim 6 wherein said fiber tow is in the form of a woven fabric.

8. A process according to claim 6 wherein said contacting of step (a) is carried out by moving said fiber tow through said liquid medium.

9. A process according to claim 6 wherein said liquid medium is a solution of a metal alkoxide or an organometallic compound.

10. A process according to claim 9 wherein said fiber tow is pre-treated so as to deposit a layer of metal hydroxide on the surface of each filament in said tow.

11. A process according to claim 10 wherein said liquid medium is a solution of a metal alkoxide in an alcohol solvent.

12. A process for applying substantially uniform metal oxide coatings onto a plurality of refractory filaments in the form of a fiber tow, which process comprises (a) contacting said refractory fiber tow with a liquid medium which contains a solution of a metal alkoxide in an alcohol solvent so that a substantially continuous film forms on the surface of each of said filaments, said liquid medium having such chemical characteristics that a layer of said metal alkoxide at least about 50 angstroms thick becomes attached to the exterior surfaces of each of said filaments within said liquid medium;

(b) rinsing said tow with an alcohol and then treating said filaments and said attached layers to stabilize said layers attached in step (a);

(c) optionally repeating steps (a) and (b) with the same liquid medium or with a liquid medium which is a solution of an alkoxide of a different metal so as to increase the total thickness of said attached layers; and (d) heating said filaments under conditions which convert substantially all of said metal alkoxide attached thereto into substantially continuous, uniform, metal oxide coatings.

13. A process according to claim 12 wherein step (c) is performed at least 3 times and, each time, prior to step (c) and as a part of step (b), said coated filaments are treated so as to convert said attached metal alkoxide to metal hydroxide.

14. A process according to claim 12 wherein said rinsed filaments are contacted with water vapor or steam as a part of said treating step and are then dried to remove bulk water prior to step (c).

15. A process according to claim 14 wherein said fiber tow is in the form of a woven fabric.

16. A process according to claim 15 wherein said contacting of step (a) is carried out by moving said fiber tow through said liquid medium.

17. A process for simultaneously applying substantially uniform refractory coatings onto a plurality of refractory filaments in a fiber tow, which process comprises contacting said plurality of refractory filaments with a liquid medium so that a substantially continuous film forms on the surface of each of said filaments, said liquid medium being a sol of a refractory metal oxide, refractory metal hydroxide, or refractory metal alkoxide, and the temperature of said filaments being regulated so that, when said filaments are brought into contact with said liquid medium, said liquid medium in the immediate vicinity of the surfaces of said filaments becomes thermally unstable, causing deposition of said metal oxide, metal hydroxide or metal alkoxide onto the surface of each said filament in the form of a layer of substantially uniform thickness;

then treating said tow to substantially remove residual components of said liquid medium other than said layer of metal oxide, metal hydroxide or metal alkoxide attached to said filaments; and heating said treated tow to a sintering temperature under conditions suitable to convert substantially all of said metal oxide, metal hydroxide or metal alkoxide attached thereto into substantially continuous, uniform, homogeneous refractory coatings on said filaments.

18. A process according to claim 17 wherein as a part of said treating step said filaments are first removed from contact with said liquid medium and then washed with a solvent so as to remove any residual liquid medium therefrom.

19. A process for simultaneously applying substantially uniform refractory metal oxide coatings onto a plurality of refractory filaments in a fiber tow, which process comprises contacting in a reservoir said plurality of refractory filaments with a liquid medium containing a refractory metal salt solution, a first zone of said reservoir being a hot saturated solution and a second zone of said reservoir being cooled to a lower temperature than the temperature of said first zone to create a supersaturated region, said filaments being passed through said supersaturated region so as to cause said metal salt to deposit onto the surface of each said filament as a substantially continuous uniform thickness layer of metal salt;

then treating said tow to substantially remove residual components of said liquid medium other than said layer of metal salt attached to said filaments; and heating said treated tow to a sintering temperature under conditions suitable to convert substantially all of said metal salt attached thereto into substantially continuous, uniform, homogeneous refractory metal oxide coatings on said filaments.

20. A process according to claim 19 wherein said reservoir is heated at its bottom to create said first zone and is cooled in a region thereabove to create said second zone and thereby create a natural convection flow of saturated metal salt solution into said supersaturated region.

* * * * *